US012755893B2

(12) United States Patent
Tominaga et al.

(10) Patent No.: US 12,755,893 B2
(45) Date of Patent: Oct. 6, 2026

(54) ELECTRONIC COMPONENT

(71) Applicant: Murata Manufacturing Co., Ltd., Kyoto-fu (JP)

(72) Inventors: Ryuichiro Tominaga, Nagaokakyo (JP); Keisuke Kunimori, Nagaokakyo (JP); Yuuki Kawakami, Nagaokakyo (JP); Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 670 days.

(21) Appl. No.: 18/345,970

(22) Filed: Jun. 30, 2023

(65) Prior Publication Data

US 2024/0013970 A1 Jan. 11, 2024

(30) Foreign Application Priority Data

Jul. 6, 2022 (JP) ................................ 2022-109171

(51) Int. Cl.

*H01F 27/29* (2006.01)
*H01F 17/00* (2006.01)
*H01F 17/04* (2006.01)

(52) U.S. Cl.

CPC ....... *H01F 27/292* (2013.01); *H01F 17/0013* (2013.01); *H01F 17/04* (2013.01); *H01F 2017/002* (2013.01); *H01F 2017/048* (2013.01)

(58) Field of Classification Search

CPC ......... H01F 27/2804; H01F 2027/2809; H01F 17/0006; H01F 17/0013; H01F 5/003; H01F 27/29; H01F 27/292; H01F 2017/048

USPC ................................................. 336/200, 232

See application file for complete search history.

(56) References Cited

U.S. PATENT DOCUMENTS

2012/0306607 A1* 12/2012 Jeong .................. H01F 17/0013 336/192
2013/0223033 A1* 8/2013 Mano ..................... H05K 1/185 336/200
2014/0034373 A1* 2/2014 Yoshikawa ............. H01F 5/003 336/200
2014/0118976 A1* 5/2014 Yoshikawa .......... H05K 3/4602 361/761
2018/0075965 A1* 3/2018 Yoshioka ............ H01F 27/2823

(Continued)

FOREIGN PATENT DOCUMENTS

JP 2011-097054 A 5/2011
JP 2014-32978 A 2/2014
JP 2020-136466 A 8/2020

(Continued)

*Primary Examiner* — Tszfung J Chan

(74) *Attorney, Agent, or Firm* — Studebaker Brackett PLLC

(57) ABSTRACT

An electronic component capable of improving connection reliability between a via conductor and a circuit pattern. An electronic component includes a circuit pattern; an insulating resin layer covering the circuit pattern; a via conductor provided inside the insulating resin layer and connected to the circuit pattern; and a wiring member connected to the circuit pattern via the via conductor. The via conductor and the wiring member are integrally formed, and in the via conductor, a diameter of an end portion on a side close to the circuit pattern is larger than a diameter of an end portion on a side close to the wiring member.

6 Claims, 6 Drawing Sheets

(56) References Cited

U.S. PATENT DOCUMENTS

2021/0074467 A1* 3/2021 Tominaga ........... H01F 17/0013

FOREIGN PATENT DOCUMENTS

| | | | |
|---|---|---|---|
| JP | 2021-039979 | A | 3/2021 |
| JP | 2021-044294 | A | 3/2021 |
| JP | 2021-168348 | A | 10/2021 |

* cited by examiner

ELECTRONIC COMPONENT

CROSS-REFERENCE TO RELATED APPLICATION

This application claims benefit of priority to Japanese Patent Application No. 2022-109171, filed Jul. 6, 2022, the entire content of which is incorporated herein by reference.

BACKGROUND

Technical Field

The present disclosure relates to an electronic component.

Background Art

A coil component having a structure including an inductor, a resin layer covering the inductor, a pad formed on the resin layer, and a via conductor provided in the resin layer, in which the inductor and the pad are connected by the via conductor is known, for example, as described in Japanese Patent Application Laid-Open No. 2014-32978.

SUMMARY

In a conventional coil component, when heat is applied from the outside due to component mounting by a reflow method or the like, stress due to thermal expansion and contraction of a resin layer may be concentrated on a connection portion between a via conductor and an inductor and break, and there is a problem in connection reliability between the via conductor and the inductor. This problem is common not only to a coil component but also to an electronic component in which a circuit pattern other than an inductor is covered with a resin layer.

Accordingly, the present disclosure provides an electronic component capable of improving connection reliability between a via conductor and a circuit pattern.

One aspect of the present disclosure is an electronic component including a circuit pattern; an insulating resin layer covering the circuit pattern; a via conductor provided inside the insulating resin layer and connected to the circuit pattern; and a wiring member connected to the circuit pattern via the via conductor. The via conductor and the wiring member are integrally formed, and in the via conductor, a diameter of an end portion on a side close to the circuit pattern is larger than a diameter of an end portion on a side close to the wiring member.

According to the present disclosure, connection reliability between the via conductor and the circuit pattern can be improved.

DETAILED DESCRIPTION

Hereinafter, embodiments of the present disclosure will be described with reference to the drawings.

In the following embodiment, a coil component will be described as an example of an electronic component. The drawings may include schematic views at a part thereof. In addition, dimensions and ratios in the schematic views may be different from actual numerical values. In the sectional views, hatching indicating a section of the component may be omitted for easy understanding.

First Embodiment

Figure 1:
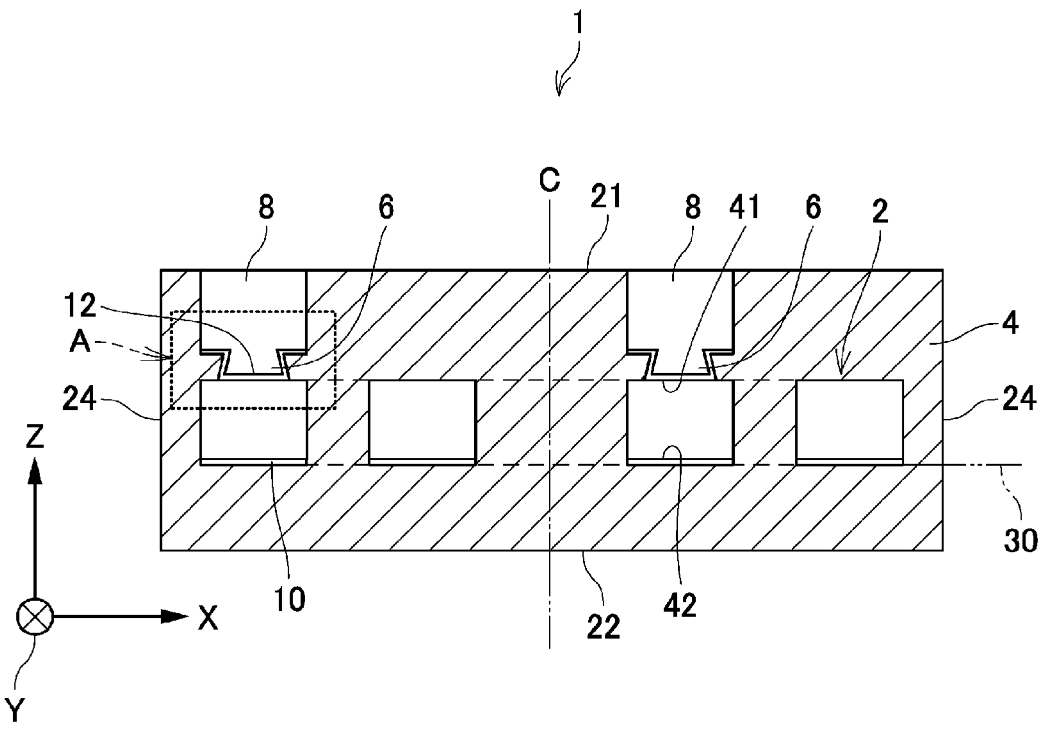
FIG. 1 is a schematic view illustrating an internal structure of a coil component according to a first embodiment of the present disclosure.
Figure 2:
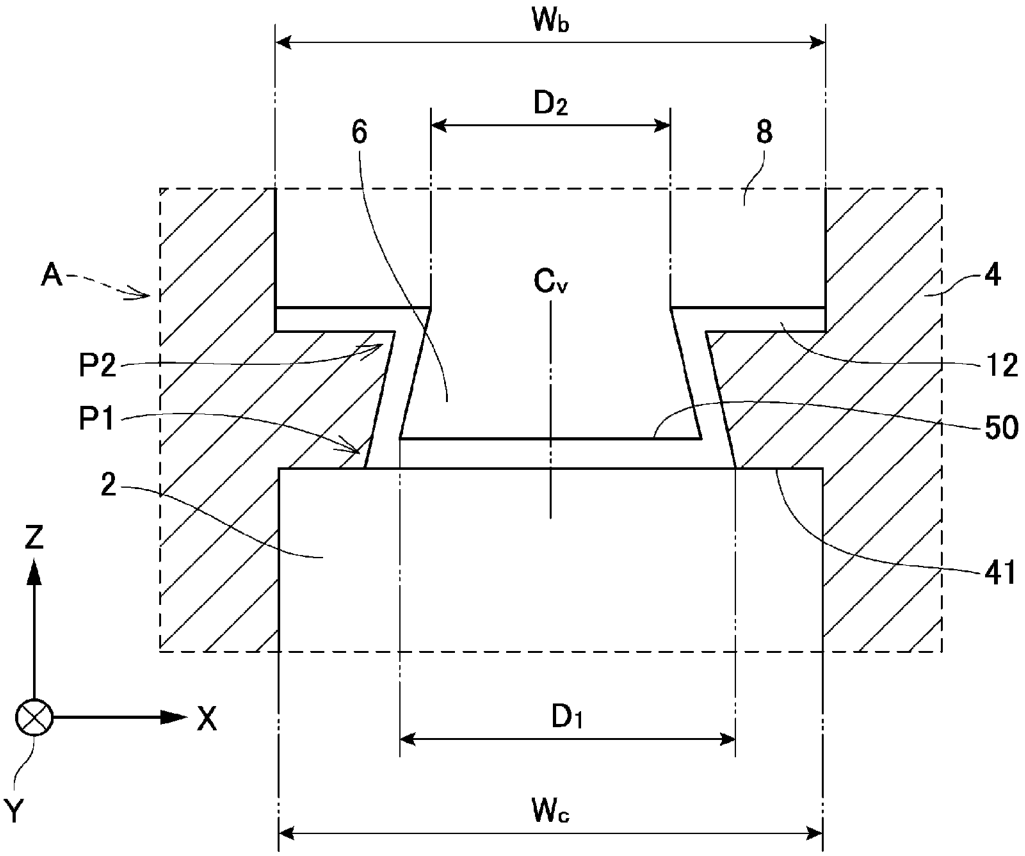
FIG. 2 is an enlarged view of a portion indicated by an arrow A in FIG. 1.

FIG. 1 is a sectional view schematically illustrating an internal structure of a coil component 1 according to the present embodiment. FIG. 2 is an enlarged view of a portion indicated by an arrow A in FIG. 1.

As illustrated in FIG. 1, the coil component 1 is an electronic component having a structure including an inductor circuit pattern 2, an insulating resin layer 4 covering the inductor circuit pattern 2, via conductors 6 provided inside the insulating resin layer 4, and external terminals 8 exposed to a surface of the insulating resin layer 4, in which the inductor circuit pattern 2 and the external terminals 8 are connected via the via conductors 6.

Further, in the coil component 1 of the present embodiment, seed layers 10 and 12 are formed at the interface between the insulating resin layer 4 and the inductor circuit pattern 2 and the interface between the inductor circuit pattern 2 and the via conductor 6, respectively. The seed layers 10 and 12 are thin film layers for forming the inductor circuit patterns 2, the via conductors 6, and the external terminals 8 by plating growth, and are formed of a conductive material.

The insulating resin layer 4 is formed of an insulating resin material and constitutes an element body of the coil component 1. The insulating resin layer 4 of the present embodiment is formed in a substantially rectangular parallelepiped shape, and the external terminals 8 are exposed from any one side surface.

Hereinafter, a side surface where the external terminals 8 are exposed is referred to as a first main surface 21, and a side surface facing the first main surface 21 is referred to as a second main surface 22. A side surface other than the first main surface 21 and the second main surface 22 is referred to as a non-main surface 24. Further, a direction orthogonal to the first main surface 21 is referred to as a Z direction, a plane including the first main surface 21 is defined as an XY plane, an X direction of the XY plane corresponds to a left-right direction of the drawing, and a Y direction corresponds to a depth direction of the drawing.

The sectional view illustrated in FIG. 1 is a view of a section of the coil component 1 including the Z direction (hereinafter, referred to as a "section in the Z direction").

In the present specification, the terms "upper", "lower", "left", and "right" used for each of the X direction, the Y direction, and the Z direction are used for convenience based on the drawings in order to distinguish the relative directions, and do not correspond to the vertical direction and the horizontal direction indicating the absolute direction, and the direction based on the posture of the electronic component in the mounting state or the use state.

The first main surface 21 and the second main surface 22 do not need to be parallel to the XY plane, and may include unevenness in its surface, and may include distortion in sectional view of a section in the Z direction (X-Z section and Y-Z section).

The shape of the insulating resin layer 4 is not limited to a rectangular parallelepiped shape as long as the insulating resin layer 4 has the first main surface 21, and may be a cylindrical shape or a polygonal shape. In addition, the insulating resin layer 4 may contain a filler that is a non-magnetic powder such as silica or barium sulfate.

The inductor circuit pattern 2 is a circuit pattern formed of a conductive material, and includes a spiral pattern in plan view of the first main surface 21. As illustrated in FIG. 1, the inductor circuit pattern 2 is provided along a virtual plane 30 substantially parallel to the first main surface 21 in sectional view in the Z direction, and a substantially center C of the spiral pattern is substantially parallel to the Z direction. FIG. 1 illustrates a section including the center C parallel to the Z direction.

The inductor circuit pattern 2 of the present embodiment has a substantially rectangular shape in sectional view in the Z direction, and includes a pair of a first flat surface portion 41 and a second flat surface portion 42 parallel to the first main surface 21, and the via conductor 6 is connected to the first flat surface portion 41 on the side close to the first main surface 21, of the first flat surface portion 41 and the second flat surface portion 42, via the seed layer 12.

The inductor circuit pattern 2 may have an appropriate shape such as a trapezoidal shape as long as the inductor circuit pattern 2 has the first flat surface portion 41 and the second flat surface portion 42. In addition, the first flat surface portion 41 and the second flat surface portion 42 do not need to be perfect flat surfaces, and may include unevenness and distortion. Similarly, side surfaces of the inductor circuit pattern 2 other than the first flat surface portion 41 and the second flat surface portion 42 do not have to be perfect flat surfaces, and may include unevenness and distortion.

The via conductors 6 are conductive regions formed of a conductive material, and are provided at end portions on the inner peripheral side and the outer peripheral side of the spiral inductor circuit pattern 2. As illustrated in FIG. 1, each via conductor 6 extends from the first flat surface portion 41 of the inductor circuit pattern 2 toward the first main surface 21 to the external terminals 8 in the sectional view in the Z direction. As illustrated in FIG. 2, the via conductor 6 of the present embodiment has a central axis Cv substantially parallel to the Z direction, has a truncated cone shape (also referred to as a head-cut truncated cone shape) expanding on the inductor circuit pattern 2 side with respect to the first main surface 21, and has a substantially trapezoidal shape in sectional view in the Z direction.

Hereinafter, in the via conductor 6, a surface in contact with the seed layer 12 on the inductor circuit pattern 2 side is referred to as a via bottom 50. The via conductor 6 is not limited to a truncated cone shape, and may have another truncated shape such as a polygonal truncated cone shape.

The external terminal 8 is an example of a wiring member soldered to a mounting substrate, and is formed of a conductive material. As illustrated in FIG. 1, the external terminal 8 of the present embodiment extends in the Z direction from each of the via conductors 6 to the first main surface 21 in the sectional view in the Z direction, and is formed integrally with the via conductor 6. "The external terminal 8 and the via conductor 6 are integrally formed" means that the via conductor 6 and the external terminal 8 are continuously formed in the Z direction during manufacturing, so that there is no clear interface therebetween.

As the insulating resin material forming the insulating resin layer 4, for example, a material mainly composed of a resin material such as an epoxy resin, an acrylic resin, a phenol resin, or a polyimide resin, or a material mainly composed of a mixed material of some of these resin materials can be used.

As the conductive material forming the inductor circuit pattern 2, for example, a material containing an element such as gold (Au), platinum (Pt), palladium (Pd), silver (Ag), copper (Cu), aluminum (Al), cobalt (Co), chromium (Cr), zinc (Zn), nickel (Ni), titanium (Ti), tungsten (W), iron (Fe), tin (Sn), or indium (In) as a main component, or a material containing a compound of some of these elements as a main component can be used.

In addition, as the conductive material forming the via conductor 6 and the external terminal 8, for example, a material containing an element such as copper (Cu), silver (Ag), gold (Au), or iron (Fe) as a main component, or a material containing a compound of some of these elements as a main component can be used. However, in the present embodiment, the via conductor 6 and the external terminal 8 are formed of the same conductive material.

As the conductive material forming the seed layers 10 and 12, for example, a material containing an element such as gold (Au), platinum (Pt), palladium (Pd), silver (Ag), copper (Cu), aluminum (Al), cobalt (Co), chromium (Cr), zinc (Zn), nickel (Ni), titanium (Ti), tungsten (W), iron (Fe), tin (Sn), or indium (In) as a main component, or a material containing a compound of some of these elements as a main component can be used. The seed layer 10 and the seed layer 12 may be formed of different conductive materials.

Here, as illustrated in FIG. 2, in the coil component 1 of the present embodiment, the via conductor 6 is formed to have dimensions that fall within respective ranges of a wiring width Wc of the first flat surface portion 41 in the wiring of the inductor circuit pattern 2 and an electrode width Wb of the connection portion of the external terminal 8 with the via conductor 6 in the sectional view in the Z direction.

Specifically, as described above, since the via conductor 6 has a truncated cone shape expanding on the inductor circuit pattern 2 side with respect to the first main surface 21, the maximum diameter (the diameter of the section including the central axis Cv) of the via conductor 6 in the sectional view in the Z direction is a diameter D1 of the via bottom 50, and the diameter D1 is smaller than the wiring width Wc and the electrode width Wb. In the structure in which the via conductor 6 having such dimensions connects the inductor circuit pattern 2 and the external terminal 8, the insulating material of the insulating resin layer 4 enters within the range of the wiring width Wc of the inductor circuit pattern 2 and the electrode width Wb of the external terminal 8 in sectional view in the Z direction.

In this state, when heat is applied to the insulating resin layer 4 from the outside at the time of mounting the coil component 1 using reflow or the like, stress is applied to respective connection portions P1 and P2 of the inductor circuit pattern 2 and the external terminal 8, and the via conductor 6 due to a difference in expansion rate with respect to temperature between the insulating material of the insulating resin layer 4 and the conductor materials of the inductor circuit pattern 2, the via conductor 6, and the external terminal 8 in the vicinity of the respective connection portions P1 and P2.

In the present embodiment, since the via conductor 6 and the external terminal 8 are integrally formed as described above, if stress is applied to the connection portion P2, breakage hardly occurs at the connection portion P2.

On the other hand, it has been verified by experiments and the like by the inventors that the above-described stress tends to concentrate on a thin portion of the via conductor 6 in a section in the Z direction. That is, when the connection portion P1 between the via conductor 6 and the inductor circuit pattern 2 is, for example, the smallest, stress concentrates on the connection portion P1, which may cause breakage at the connection portion P1 or peeling of the via bottom 50 from the first flat surface portion 41 of the inductor circuit pattern 2 to cause connection failure.

Therefore, the via conductor 6 of the present embodiment has a truncated cone shape expanding on the inductor circuit pattern 2 side with respect to the first main surface 21, so that the diameter D1 of the via bottom 50 is formed to be larger than a diameter D2 (that is, a diameter of the connection portion P2) of the end portion on the external terminal 8 side, and stress is concentrated on the connection portion P2 where breakage is less likely to occur as compared with the connection portion P1. As a result, since the stress at the connection portion P1 is relaxed, breakage and peeling are suppressed, and connection reliability between the via conductor 6 and the inductor circuit pattern 2 is improved.

The inventors conducted an experiment by changing the dimensional shape of the via conductor 6, and obtained the following knowledge regarding the connection reliability between the via conductor 6 and the inductor circuit pattern 2.

That is, when the ratio (=T/D1) of the length T (that is, the distance between the end portion on the inductor circuit pattern 2 side and the end portion on the external terminal 8 side) of the via conductor 6 in the Z direction to the diameter D1 of the via bottom 50 is in the range of 0.1 or more and 0.2 or less (i.e., from 0.1 to 0.2), the connection reliability is further improved when D2/D1 is 0.9 or less. In addition, in a case where D2/D1 is 0.7 or more in the same range, defects are less likely to occur in the via conductors 6 in the manufacturing process described below, and the yield can be improved. Such defects include, for example, non-adhesion of the seed layer 12 when the seed layer 12 is formed in the via openings 66 (FIG. 3: step S7), occurrence of voids when plating growth is performed in the via openings 66 (FIG. 3: step S8), and the like.

Next, a method for manufacturing the coil component 1 having such a structure will be described.

Figure 3:
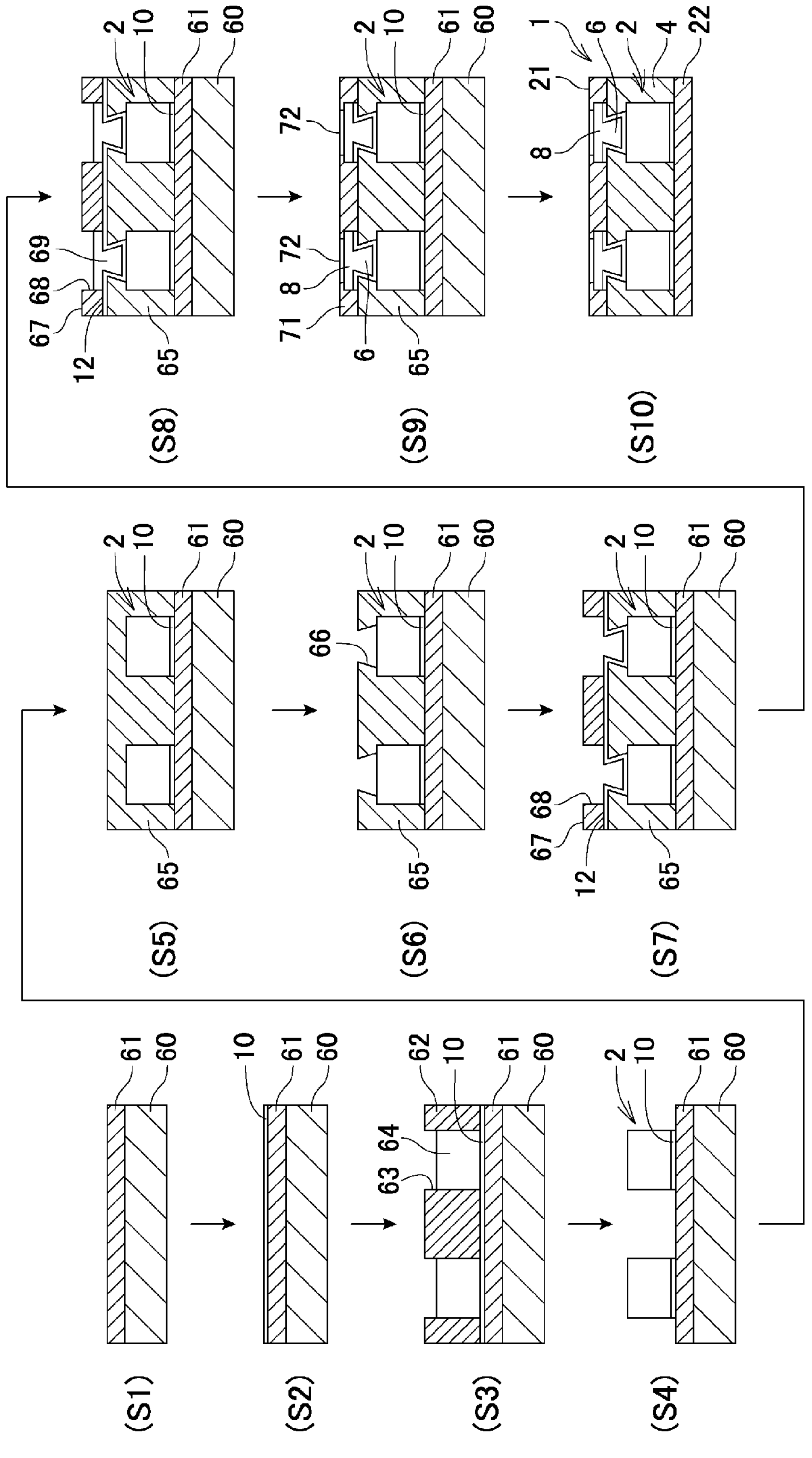
FIG. 3 is a view illustrating a manufacturing process of the coil component.

FIG. 3 is a view illustrating a manufacturing process of the coil component 1.

In the present manufacturing process, the inductor circuit pattern 2, the via conductors 6, and the external terminals 8 are formed by a Semi Additive Process (SAP).

As illustrated in FIG. 3, in manufacturing the coil component 1, first, a resin layer (hereinafter, referred to as a "lower insulating resin layer 61") to be the second main surface 22 of the insulating resin layer 4 is formed on a support layer 60 by printing or the like (step S1). Next, the seed layer 10 is formed on the lower insulating resin layer 61 by sputtering or electroless plating (step S2).

The thickness of the seed layer 10 is not particularly limited as long as electric charge can be shared and the seed layer 10 sufficiently functions as a seed layer for electrolytic plating for forming the inductor circuit pattern 2, but is desirably, for example, 2 μm or less. The same applies to the seed layer 12 in step S7 described later.

In order to improve close contact between the insulating resin layer 4 and the seed layer 10, a close contact layer may be formed between the lower insulating resin layer 61 and the seed layer 10 to form a multilayer. In this case, the material of the close contact layer can be selected according to the purpose of forming the close contact layer as long as the material does not affect the formation of the inductor circuit pattern 2, and for example, titanium (Ti) is desirable.

Next, a resist 62 is applied to the seed layer 10, trenches 63 for forming the inductor circuit pattern 2 are formed by patterning using photolithography, and then conductive materials 64 are plated and grown in the trenches 63 by electrolytic plating (step S3). Then, the resist 62 is removed, and the seed layer 10 is removed by etching (step S4). Thus, the inductor circuit pattern 2 is formed.

The inductor circuit pattern 2 may be formed not only by electrolytic plating but also by an electroless plating method, a sputtering method, a vapor deposition method, a coating method, or the like.

Next, a resin layer (hereinafter, referred to as an "intermediate insulating resin layer 65") made of a photosensitive insulating resin material is formed on the lower insulating resin layer 61 by lamination or the like so as to cover the inductor circuit pattern 2 (step S5).

Next, the via openings 66 for forming the via conductors 6 is formed on the upper surface of the intermediate insulating resin layer 65 by photolithography (step S6).

In step S6, the via openings 66 are formed in a truncated cone shape.

Specifically, when the intermediate insulating resin layer 65 is a negative type photosensitive material, a focus position of a projection exposure machine used for photolithography is set to be shifted upward from the surface of the intermediate insulating resin layer 65. As a result, after development, the via openings 66 formed in the intermediate insulating resin layer 65 have a reverse tapered shape (that is, a trapezoidal shape) in which the width decreases from the surface of the intermediate insulating resin layer 65 toward the support layer 60 in the sectional view in the Z direction. Furthermore, when the intermediate insulating resin layer 65 is a positive type photosensitive material, the via openings 66 having a reverse tapered section can be similarly formed by shifting the focus position of the projection exposure machine downward from the surface of the intermediate insulating resin layer 65.

Next, the seed layer 12 is formed on the upper surface of the intermediate insulating resin layer 65 in which the via openings 66 are opened by sputtering or electroless plating. Thereafter, resists 67 are applied to the seed layer 12, and patterning by photolithography is performed to form trenches 68 for forming the external terminals 8 (step S7). In step S7, the seed layer 12 is also formed on the internal side surfaces of the via openings 66 and the inductor circuit pattern 2 (first flat surface portion 41: FIG. 2) exposed from the via openings 66.

Next, conductive materials 69 are grown by plating in the trenches 68 of the resists 67 by electrolytic plating (step S8). Then, the resists 67 are removed, the seed layer 12 is removed by etching, and then a solder resist 70 is applied to the surface of the intermediate insulating resin layer 65 (excluding the portions of the external terminals 8) to form an upper insulating resin layer 71 to be the first main surface 21 of the insulating resin layer 4, and plating processing of applying plating 72 to the exposed portions for the external terminal 8 is performed (step S9). In step S9, the via conductors 6 and the external terminals 8 are integrally formed.

Thereafter, the support layer 60 is peeled off by grinding or the like, and then singulated (step S10), whereby the coil component 1 is obtained.

According to the present embodiment, the following effects are obtained.

The coil component 1 of the present embodiment includes the inductor circuit pattern 2, the insulating resin layer 4 covering the inductor circuit pattern 2, the via conductors 6 provided inside the insulating resin layer 4 and connected to the inductor circuit pattern 2, and the external terminals 8 connected to the inductor circuit pattern 2 inside the insulating resin layer 4 via the via conductors 6.

The via conductors 6 and the external terminals 8 are integrally formed, and the diameter D1 of the end portion of the via conductor 6 on the side close to the inductor circuit pattern 2 is larger than the diameter D2 of the end portion on the side close to the external terminal 8.

According to this configuration, if stress acts on the connection portion P1 between the inductor circuit pattern 2 and the via conductor 6 due to thermal expansion and contraction of the insulating resin material by heat applied to the coil component 1 at the time of mounting or the like, the stress acting on the connection portion P1 is relaxed. As a result, breakage and peeling at the connection portion P1 are suppressed, and connection reliability between the via conductor 6 and the inductor circuit pattern 2 can be improved.

In the coil component 1 of the present embodiment, the diameter of the via conductor 6 is the largest at the end portion (that is, the via bottom 50) on the side close to the inductor circuit pattern 2.

According to this configuration, in the via conductor 6, since the diameter D1 of the via bottom 50 is the maximum diameter, concentration of stress on the connection portion P1 can be further relaxed.

Second Embodiment

Figure 4:
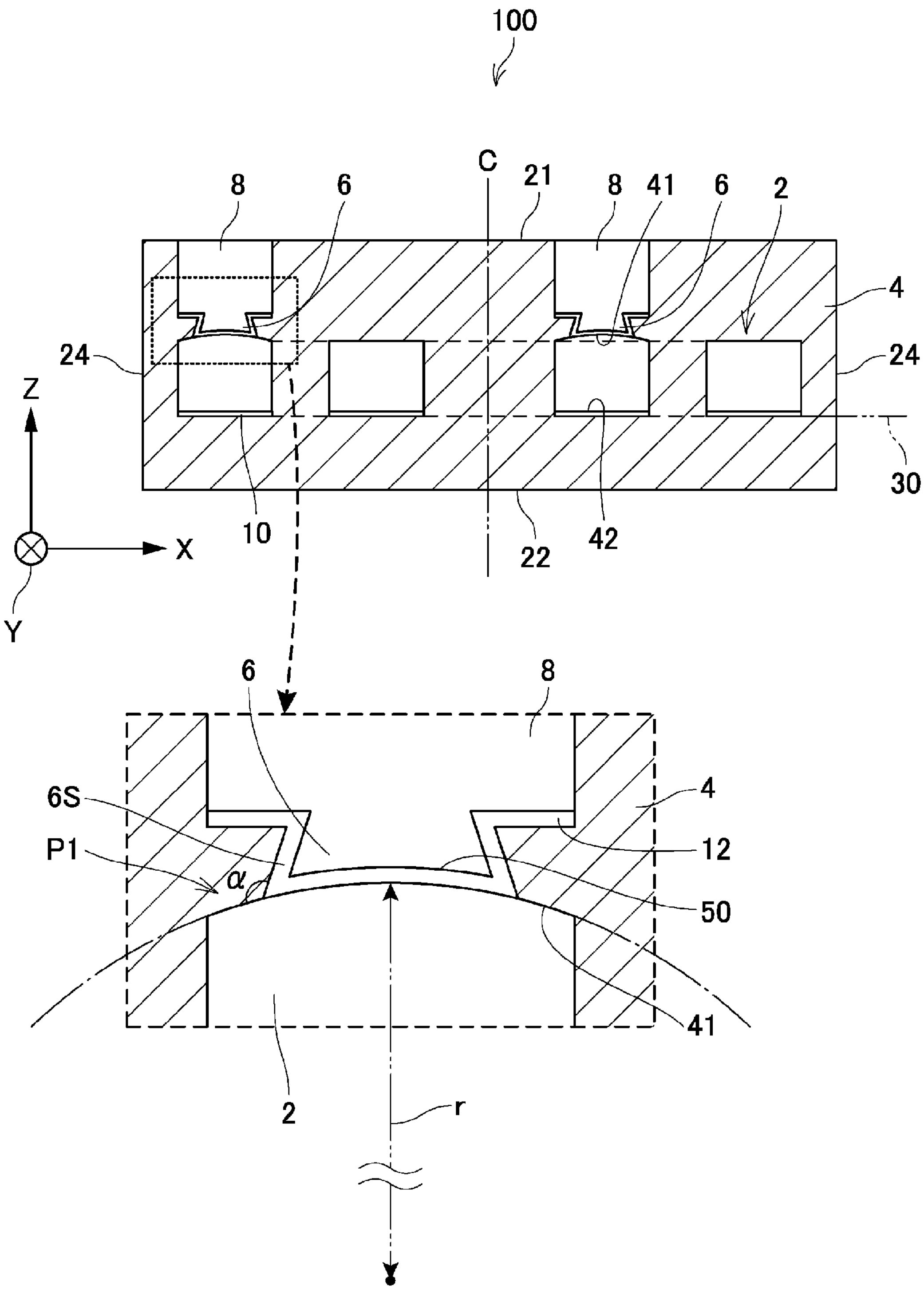
FIG. 4 is a sectional view schematically illustrating an internal structure of a coil component according to a second embodiment of the present disclosure.

FIG. 4 is a sectional view schematically illustrating an internal structure of a coil component 100 according to the present embodiment. In the drawing, the members described in the first embodiment are denoted by the same reference numerals, and the description thereof will be omitted.

As illustrated in FIG. 4, the coil component 100 of the present embodiment is different from the coil component 1 of the first embodiment in that an interface (the first flat surface portion 41 of the inductor circuit pattern 2, the seed layer 10, and the via bottom 50) at the connection portion P1 between the inductor circuit pattern 2 and the via conductor 6 has a shape having a curvature that is convex toward the first main surface 21 in the sectional view in the Z direction.

Specifically, in the manufacturing process from step S3 to step S4 in FIG. 3, the first flat surface portion 41 of the inductor circuit pattern 2 is formed so as to have a curvature that is convex toward the via conductor 6. By forming the seed layer 10 and the via conductors 6 on the first flat surface portion 41, the interface of the connection portion P1 between the inductor circuit pattern 2 and the via conductor 6 has a shape having a curvature that is convex toward the first main surface 21.

Since the interface of the connection portion P1 has a shape having a curvature, the angle α formed by a side surface 6S of the via conductor 6 and the first flat surface portion 41 in the sectional view in the Z direction is larger than that in a case where the first flat surface portion 41 is substantially flat, stress concentrated on the connection portion P1 is further relaxed, and connection reliability can be further improved.

In addition, the curvature of the first flat surface portion 41 is represented by a value of 1/r when it is assumed that the curvature is a curvature of a circumference having a radius r. Then, the inventors have found, through experiments, that the connection reliability is further improved when a value of r is 6000 m or more and 8000 m or less (i.e., from 6000 m to 8000 m).

Each of the above-described embodiments can be arbitrarily modified and applied without departing from the gist of the present disclosure.

(Modification)

In each of the above-described embodiments, the coil components 1 and 100 are exemplified as an example of the electronic component, but the electronic component is not limited to the coil components 1 and 100. In this case, as the inductor circuit pattern 2, a circuit pattern corresponding to the function, application, or the like of the electronic component is used.

Application Example

The present disclosure can also be applied to a multilayer coil component and a coil component suitable for a power inductor.

Figure 5:
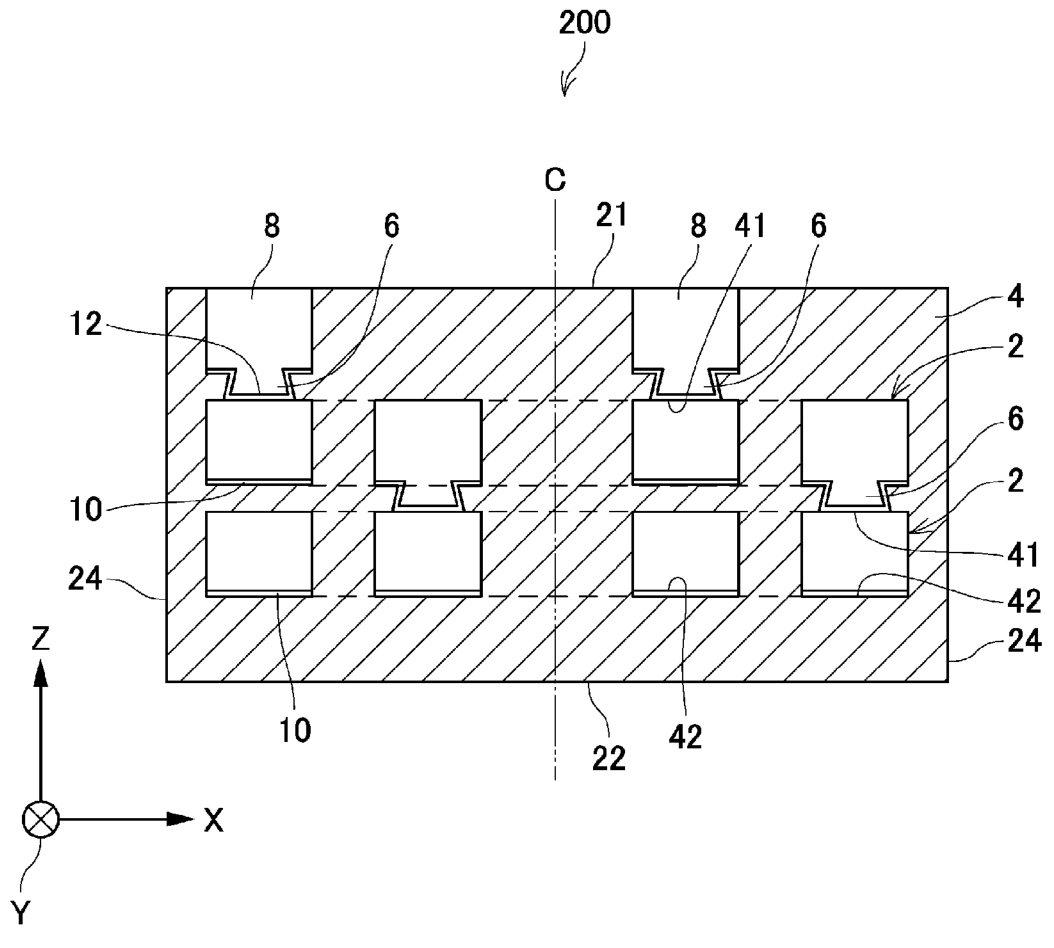
FIG. 5 is a sectional view schematically illustrating an internal structure of a multilayer coil component according to an application example of the present disclosure.

FIG. 5 is a sectional view schematically illustrating an internal structure of a multilayer coil component 200 according to an application example of the present disclosure. In the drawing, the members described in the respective embodiments are denoted by the same reference numerals, and the description thereof will be omitted.

The coil component 200 is different from the coil component 1 of the first embodiment in that a plurality of (two in the illustrated example) inductor circuit patterns 2 are stacked and formed in the Z direction, and the inductor circuit patterns 2 of the respective layers are connected by via conductors 6.

Also in this structure, by configuring the dimensions and shape of the via conductors 6 connecting the inductor circuit patterns 2 of the respective layer similarly to the first embodiment or the second embodiment, the connection reliability between the via conductor 6 and the inductor circuit pattern 2 can be improved.

In addition, as is apparent from the present application example, the member to which the end portion of the via conductor 6 on the first main surface 21 side is connected may be an appropriate wiring member such as the inductor circuit pattern 2 of another layer instead of the external terminal 8.

Figure 6:
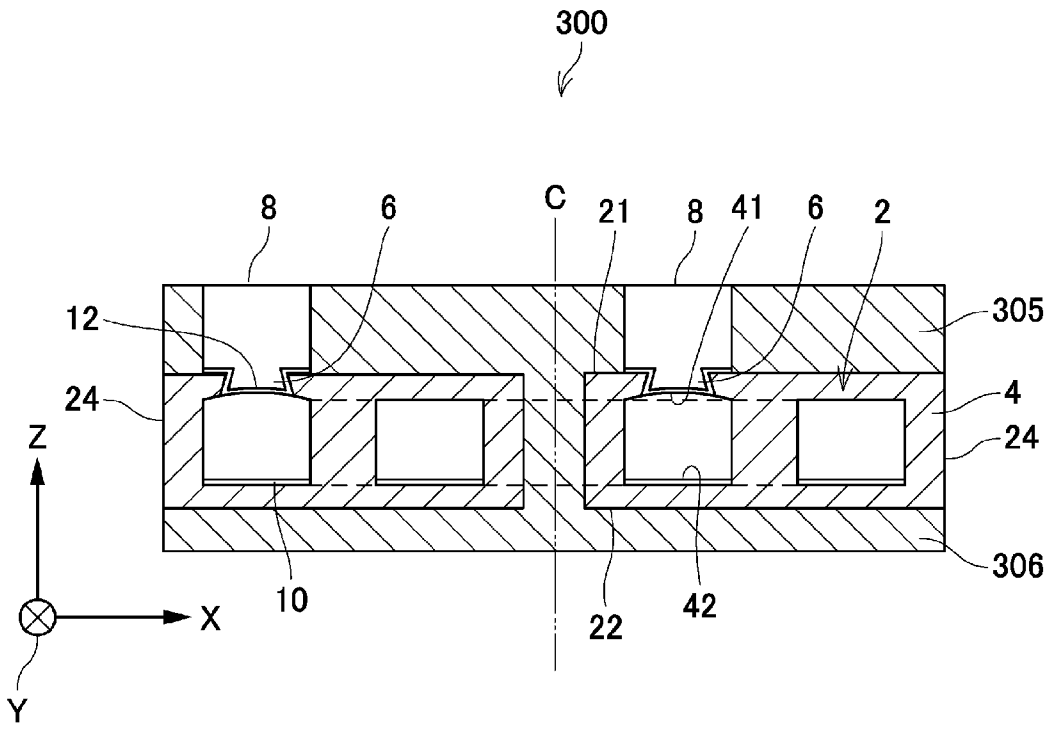
FIG. 6 is a sectional view schematically illustrating an internal structure of a coil component according to an application example of the present disclosure.

FIG. 6 is a sectional view schematically illustrating an internal structure of a coil component 300 according to an application example of the present disclosure. In the drawing, the members described in the respective embodiments are denoted by the same reference numerals, and the description thereof will be omitted.

The coil component 300 is identical to the coil component 1 of the first embodiment and the coil component 100 of the second embodiment in including the inductor circuit pattern 2, the insulating resin layer 4 covering the inductor circuit pattern 2, the via conductors 6 formed inside the insulating resin layer 4, and the external terminals 8 connected to the circuit pattern via the via conductors. The dimensions and the shape of the via conductor 6 are also identical to those of the first embodiment or the second embodiment (the illustrated example is the first embodiment).

On the other hand, the coil component 300 of the present application example includes magnetic layers 305 and 306 laminated and formed on the first main surface 21 and the second main surface 22 of the insulating resin layer 4, respectively, and is different from the coil components 1 and 100 of the first embodiment and the second embodiment in that the external terminals 8 are exposed from the magnetic layer 305 on the first main surface 21 side. In this configuration, the insulating resin layer 4 and the magnetic layers 305 and 306 sandwiching the insulating resin layer 4 constitute an element body.

The magnetic layers 305 and 306 are formed of an organic material containing metal magnetic powder. As the metal magnetic powder, a powder containing an Fe—Si-based alloy or amorphous as a main component and having an average particle diameter of 5 μm or less is used. The metal magnetic powder may be ferrite. As the organic material, an epoxy resin, a mixed material of an epoxy resin and an acrylic resin, a mixed material of an epoxy resin, an acrylic resin, and other materials, or the like is used.

Since the insulating resin layer 4 enclosing the inductor circuit pattern 2 of the coil component 300 is sandwiched between the magnetic layers 305 and 306, the coil component 300 is suitable for use as a power inductor mounted on a power supply circuit or the like.

Directions such as horizontal and vertical directions, various numerical values, shapes, and materials in the above-described embodiments include a range (so-called equivalent range) in which the same functions and effects as those of the directions, numerical values, shapes, and materials are exhibited unless otherwise specified.

Other Embodiments

In the above-described embodiments, the planar shape of the inductor circuit pattern 2 is a spiral shape (so-called spiral shape having two or more turns), but the present disclosure is not limited thereto. The planar shape of the inductor circuit pattern 2 may be, for example, a helical shape (circling shape of less than one turn), a meander shape (meandering shape), or a linear shape.

In the above-described embodiments, the inductor circuit pattern 2 has a substantially rectangular shape having a substantially right-angled corner in the sectional view in the Z direction. However, the present disclosure is not limited to this. The sectional view shape of the inductor circuit pattern 2 may be, for example, a rectangular shape in which corner portions are formed in a curved shape in FIG. 2, and the boundary between the first flat surface portion 41 and the adjacent left and right side surface portions may not be clear. Alternatively, the sectional view shape of the inductor circuit pattern 2 may have, for example, an inverted U-shaped section in which the first flat surface portion 41 having a curvature is connected to the left and right side surface portions by a curve in FIG. 4.

In addition, the sectional shape of the via conductor 6 is not limited to the frustum shape such as the truncated cone or the polygonal frustum described above. From the viewpoint of improving connection reliability between the via conductor 6 and the inductor circuit pattern 2, the sectional shape of the via conductor 6 can be any shape as long as the diameter of the via bottom 50 is not the minimum diameter of the via conductor 6. For example, in the sectional shape, the via conductor 6 may have a shape in which the side surface is formed by a curve and the width changes in the Z direction.

In the above-described embodiments, the external terminals 8 are formed so as to be exposed to the first main surface 21 of the insulating resin layer 4, but the configuration of the external terminals is not limited thereto. For example, external terminals may be formed as conductors on the first main surface 21 in FIG. 1, and the external terminals 8 illustrated in FIG. 1 may be used as lead-out wirings between the external terminals and the via conductors 6. Such external terminals formed as conductors on the first main surface 21 can be formed by coating, printing, or plating a conductor material containing a metal such as Cu, Ni, Sn, or Au.

In step S2 of FIG. 3, the method for forming the lower insulating resin layer 61 is not limited to printing. The lower insulating resin layer 61 can be formed by any method that can be used for forming the resin layer, such as spin coating or dry film resist bonding.

In addition, in FIG. 3, different resin materials may be used for all or a part of the lower insulating resin layer 61, the intermediate insulating resin layer 65, and the upper insulating resin layer 71 constituting the insulating resin layer 4, or the same resin material may be used for all of them. For example, a photosensitive resin can be used for the intermediate insulating resin layer 65 subjected to patterning by a projection exposure machine, and a resin having no photosensitivity can be used for the lower insulating resin layer 61 not subjected to patterning. For the upper insulating resin layer 71, a photosensitive resin can be used in a case where patterning is performed by photolithography, and a resin having no photosensitivity can be used in a case where patterning is performed by a physical processing method such as laser or blast.

Configurations Supported by Above Embodiment, Etc.

The above-described embodiments, modifications, and application examples support the following configurations.

(Configuration 1) An electronic component including: a circuit pattern; an insulating resin layer covering the circuit pattern; a via conductor provided inside the insulating resin layer and connected to the circuit pattern; and a wiring member connected to the circuit pattern via the via conductor, in which the via conductor and the wiring member are integrally formed, and in which in the via conductor, a diameter of an end portion on a side close to the circuit pattern is larger than a diameter of an end portion on a side close to the wiring member.

According to the electronic component of the configuration 1, stress acting on the connection portion between the circuit pattern and the via conductor due to heat applied during mounting or the like is relaxed. Therefore, in the electronic component of the configuration 1, breakage and peeling at the connection portion are suppressed, and connection reliability between the via conductor and the circuit pattern is improved.

(Configuration 2) The electronic component according to the configuration 1, in which the diameter of the via conductor is largest at the end portion on the side close to the circuit pattern.

According to the electronic component of the configuration 2, concentration of stress on the connection portion between the via conductor and the circuit pattern can be further relaxed.

(Configuration 3) The electronic component according to the configuration 1 or 2, in which in the circuit pattern, a surface to which the via conductor is connected has a curvature that is convex toward the via conductor.

According to the electronic component of the configuration 3, as compared with the case where the surface of the circuit pattern at the connection portion with the via conductor is substantially flat, the stress concentrated at the connection portion can be further relaxed, and the connection reliability can be further improved.

(Configuration 4) The electronic component according to the configuration 3, in which assuming that the curvature is a curvature of a circumference having a radius r, the curvature is represented by a value of 1/r, and a value of r is 6000 m or more and 8000 m or less (i.e., from 6000 m to 8000 m).

According to the electronic component of the configuration 4, the connection reliability between the circuit pattern and the via conductor can be further improved.

What is claimed is:

1. An electronic component comprising:

a circuit pattern;

an insulating resin layer covering the circuit pattern;

a via conductor inside the insulating resin layer and connected to the circuit pattern; and a wiring member connected to the circuit pattern via the via conductor, wherein the via conductor and the wiring member are integrally configured, and a diameter D1 of an end portion of the via conductor which is close to the circuit pattern is larger than a diameter D2 of another end portion of the via conductor which is close to the wiring member, a ratio T/D1 of a length T which is a distance between the end portion and the another end portion of the via conductor to the diameter D1 is from 0.1 to 0.2, and a ratio D2/D1 is from 0.7 to 0.9.

2. The electronic component according to claim 1, wherein the diameter of the via conductor is largest at the end portion of the via conductor on a side close to the circuit pattern.

3. The electronic component according to claim 1, wherein a surface of the circuit pattern, to which the via conductor is connected, has a curvature that is convex toward the via conductor.

4. The electronic component according to claim 3, wherein when assuming that the curvature is a curvature of a circumference having a radius r, the curvature is expressed by a value of 1/r and a value of r is in a range from 6000 m to 8000 M.

5. The electronic component according to claim 2, wherein a surface of the circuit pattern, to which the via conductor is connected, has a curvature that is convex toward the via conductor.

6. The electronic component according to claim 5, wherein when assuming that the curvature is a curvature of a circumference having a radius r, the curvature is expressed by a value of 1/r and a value of r is in a range from 6000 m to 8000 m.

* * * * *